Jan. 2, 1923.
C. L. FLORA ET AL.
AUTOMOBILE STEERING ATTACHMENT.
FILED JAN. 19, 1922.
1,440,666
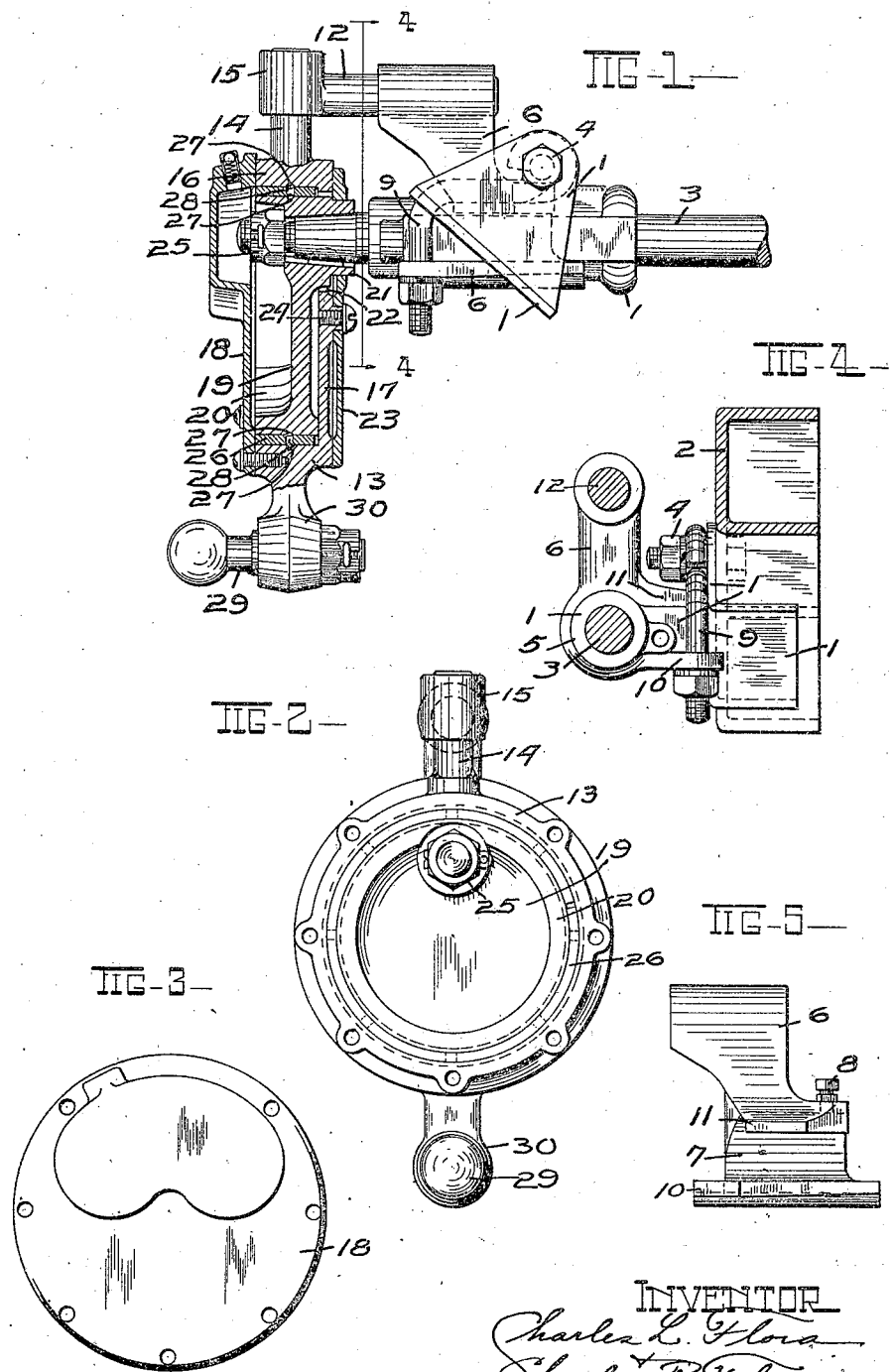
INVENTOR
Charles L. Flora
Charles R. Flora
by
Owen, Owen & Crampton Patented Jan. 2, 1923.

1,440,666

UNITED STATES PATENT OFFICE.

CHARLES L. FLORA AND CHARLES R. FLORA, OF SYLVANIA, OHIO, ASSIGNORS TO WALTER STEWART, OF TOLEDO, OHIO.

AUTOMOBILE STEERING ATTACHMENT.

Application filed January 19, 1922. Serial No. 530,300.

*To all whom it may concern:*

Be it known that we, CHARLES L. FLORA and CHARLES R. FLORA, citizens of the United States, and residents of Sylvania, in the county of Lucas and State of Ohio, have made an invention appertaining to Automobile Steering Attachments; and we do hereby declare the following to be a full, clear, and exact description of the invention, such as will enable others skilled in the art to which it appertains to make and use the same, reference being had to the accompanying drawings and to the characters of reference marked thereon, which form a part of this specification.

Our invention has for its object to provide a steering attachment for self propelled vehicles of different kinds. It particularly has for its object to provide an efficient means that may be readily attached to the steering mechanism of a Ford automobile or truck, and which will coact therewith to greatly reduce the road shock on the steering wheel. It enables better control of the vehicle and reduces the deflection by reason of unequal resistance met by the guide wheels when travelling over the road. Moreover, the atachment embodying our invention is so constructed as to be self lubricating, whereby it responds uniformly to the conditions that it is subjected to and its life is greatly extended. Other features and advantages will appear from the following description and upon examination of the drawings.

The invention may be contained in structures of different forms. To illustrate a practical application of the invention we have selected a structure as an example of structures containing the invention and shall describe it hereinafter. The structure selected is illustrated in the accompanying drawings.

Figure 1 is of the drawings illustrates a side sectional view of the structure. Fig. 2 illustrates a front view of the attachment shown in Fig. 1, with a cover plate removed. Fig. 3 illustrates a front view of the cover plate. Fig. 4 illustrates a sectional view taken on the line 4—4 indicated in Fig. 1. Fig. 5 illustrates a bracket that may be readily connected to the bracket commonly used in Ford automobiles and trucks.

1, Figure 1, is the bracket commonly used in Ford automobiles and trucks for securing the lower end of the steering shaft in position. The bracket 1 is secured to the frame 2 so as to position the steering shaft 3 at the proper angle with respect to the frame 2. The bracket 1 is secured to the frame by a bolt and nut 4, or by a suitable rivet. The bracket 1 is provided with a sleeve 5 that surrounds the steering shaft 3. To secure the attachment embodying our invention to a Ford automobile or truck, or other self propelled vehicle having substantially the same structure, we have provided a bracket 6 that has a channel 7 that readily slips over the sleeve 5. It may be readily clamped to the bracket 1 by means of the bolt 8. It is further secured by means of a bent eye bolt 9 that extends through one flange 10 that forms one side of the channel 7 and up through the other flange 11 that forms the other side of the channel and extends along the top of the flange 11. The eye of the bolt 9 registers with the openings formed in the bracket 1 and the frame 2 through which the bolt 4 extends or through which the rivet extends that ordinarily connects the bracket 1 to the frame 2. The eye bolt 9 and the bracket 1 are secured to the frame 2 by means of the bolt and nut 4 which secures the bracket 6 in position.

The bracket 6 is provided with a bore in which a pin 12 is slidably located which permits free adjustment of parts of the attachment relative to the bracket 6. A shell 13 is provided with a pin 14 that protrudes from the shell and extends through a head 15 formed on the end of the pin 12. The pin 14 readily slides in the head 15, the two forming bearing surfaces to permit sliding movements of the pin 14, while at the same time slight rotative movements may be produced in the pin 12 relative to the bracket 6.

The shell 13 has a cylindrical flange or side 16 that has an inner cylindrical contact surface. The shell 13 is also provided with a wall 17 and a cover plate 18. Within the shell 13 is located a disc 19 having a cylindrical contact surface at its periphery. The disc 19 is provided with a flange 20 which increases the area of the contact surface. The disc 19 is provided with a boss 21 that extends through an arcuate slot 22 formed in the wall 17 of the shell. A rotatable plate 23 fits the boss 21 and closes the arcuate slot 22. The plate 23 is secured to the wall 17 by the screw 24 located concentrically with respect to the disc 19, the shell 13 and the plate 23, while the boss 21 is located eccentric with respect to the disc 19 and the shell 13. The end of the steering shaft 3 extends through the boss 21 and is secured to the disc 19 by a nut 25. When the cover 18 is secured in position on the shell 13 the shell may be filled with grease or other lubricant and thus the parts will be kept thoroughly lubricated.

In order to assure lubrication and movement between the cylindrical bearing surfaces of the shell 13 and the disc 19 and in order to obtain enduring wearing qualities which will greatly extend the life of the attachment and provide a uniform action between the parts of the attachment, we locate a cylindrical collar or a ring 26 between the contact surfaces of the disc 19 and the shell 13. The collar or ring 26 is preferably formed of brass so that the bearing surfaces are between those of iron and of brass. The contact surfaces of the shell and the disc, moreover, are provided with grooves 27 that extend circularly and preferably within the center of the contact surfaces, while the brass ring or collar is provided with openings 28 that register or connect the grooves 27. When, therefore, the shell 13 contains a lubricant it is carried around by the movement of the ring which slips or creeps between the contact surfaces of the disc and the shell.

The shell 13 is connected by a suitable bolt 29 to the steering link that connects with the connecting rod, which in turn interconnects the steering knuckles of the automobile in the manner well known in the art. The bolt 29 is located in an ear 30 formed on the shell 13. The ear 30 is located diametrically opposite to the pin 14. The shell 13 thus not only forms a lever through which the movement of the steering shaft 3 is communicated to the steering knuckles of the automobile, but also forms a means for enclosing the parts that interconnect the shell with the steering shaft whereby the parts may be maintained in a lubricated condition at all times.

In the operation, rotation of the shaft 3, which in the manner well known is reduced from the rotation of the steering wheel, is communicated to the disc 19. The rotation produced in the disc 19 being eccentric about a point located on the side of the center of the disc opposite that to which the point of connection is made to the steering knuckles through the bolt 29, the rotation of the steering wheel is further reduced since the shell 13 is swung angularly about the axis of the pin 12, while the pin 14 slides in the head 15 of the pin 12.

We claim:

In a steering attachment, a steering shaft, three concentric cylindrical members having concentric contact surfaces, the inner member connected eccentrically to the steering shaft, the outer member completely enclosing the inner members and connected to the steering knuckles of the automobile, the remaining member adapted to move circularly between the inner member and the outer member and permit free rotative movement between the inner and outer members, and means for causing pivotal movements of the outer member about a point external to the axis of the steering shaft.

In testimony whereof, we have hereunto signed our names to this specification.

CHARLES L. FLORA.
CHARLES R. FLORA.